No. 731,349. Patented June 16, 1903.

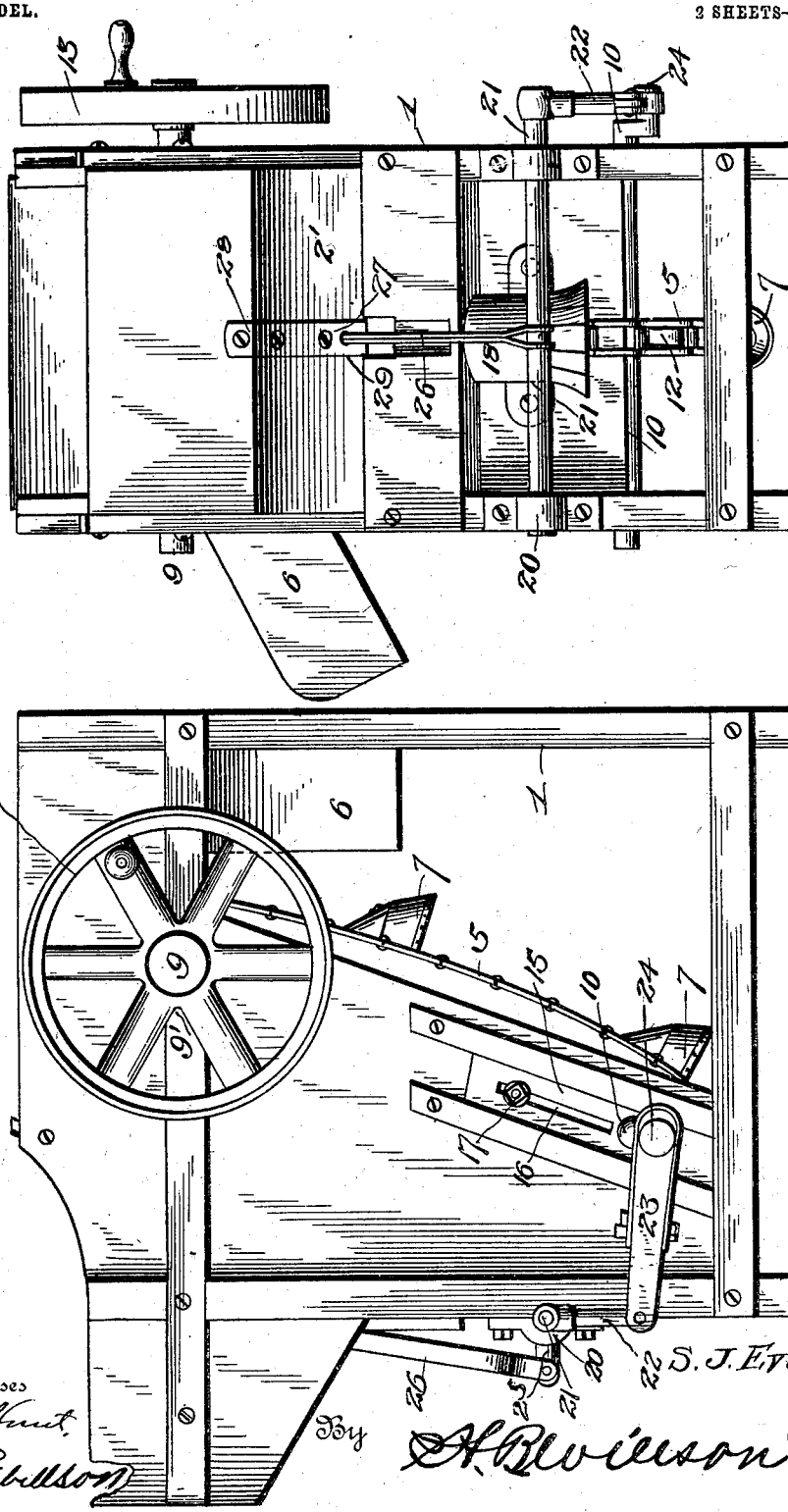

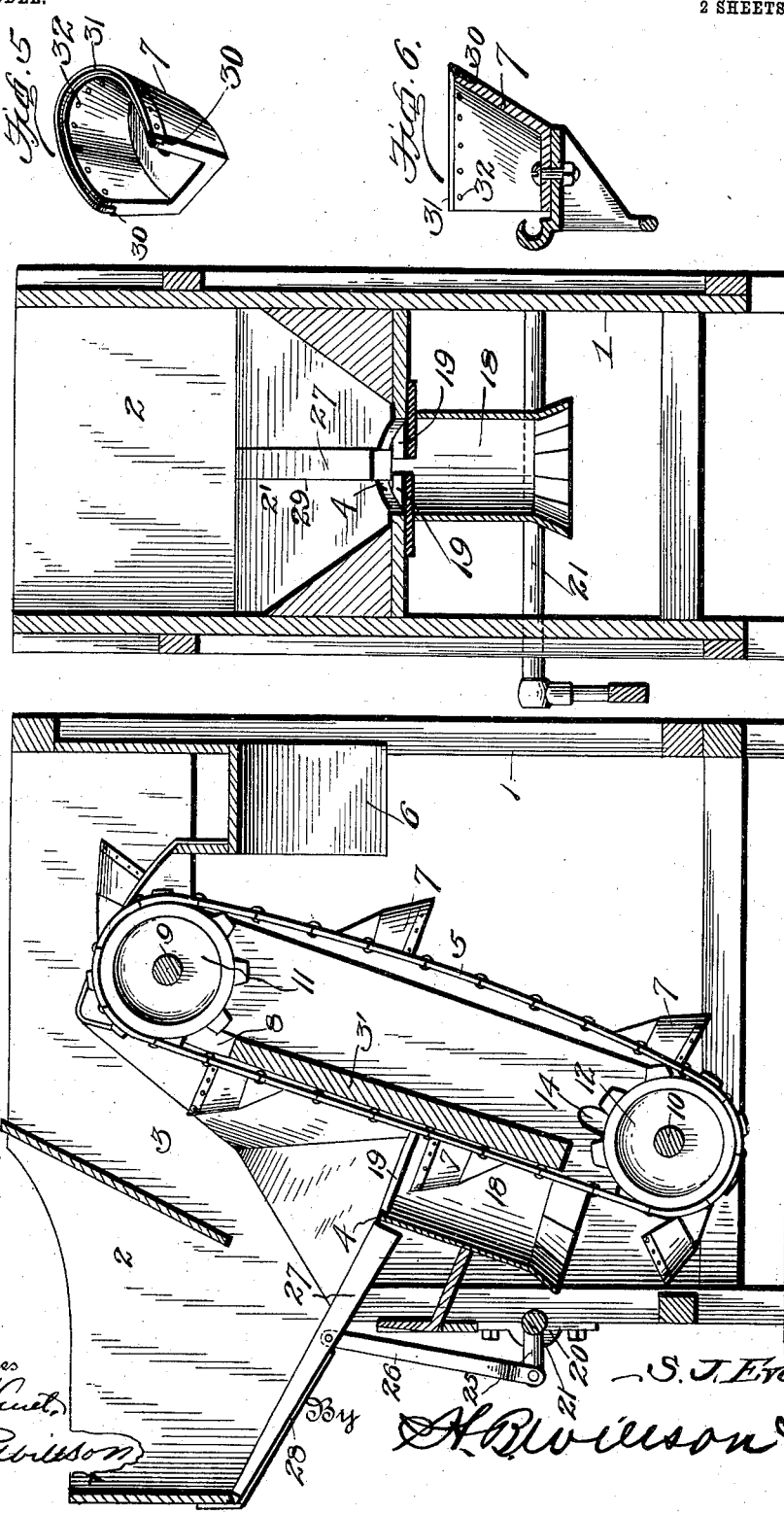

UNITED STATES PATENT OFFICE.

SYLVESTER J. EVANS, OF JEDDO, NEW YORK.

SELF-FEEDER FOR FRUIT OR VEGETABLE SLICERS.

SPECIFICATION forming part of Letters Patent No. 731,349, dated June 16, 1903.

Application filed August 7, 1902. Serial No. 118,723. (No model.)

*To all whom it may concern:*

Be it known that I, SYLVESTER J. EVANS, a citizen of the United States, residing at Jeddo, in the county of Orleans and State of New York, have invented certain new and useful Improvements in Self-Feeders for Fruit or Vegetable Slicers; and I do declare the following to be a full, clear, and exact description of the invention, such as will enable others skilled in the art to which it appertains to make and use the same.

This invention relates to a self-feeder for feeding fruit or vegetables to a slicing-machine.

The object of the invention is to provide a simple and effective machine of this character which will feed the apples or other fruit or vegetables to be sliced one at a time to the slicer, thus preventing crowding of the latter, which prevents injury to the apples in transit, and which is thoroughly reliable in action and may be operated by hand or power.

With these objects in view the invention consists in certain features of construction and combination of parts, which will be hereinafter fully set forth.

Figure 1 is a side elevation of a self-feeder embodying my invention. Fig. 2 is an end elevation of the same. Fig. 3 is a vertical longitudinal section. Fig. 4 is a vertical cross-section. Figs. 5 and 6 are details of one of the cups.

Referring now more particularly to the drawings, 1 represents a suitable frame partitioned to form a hopper 2 and a feed-chamber 3, which are in communication at their lower ends and which are provided with reversely-inclined bottom walls 2' and 3', at the juncture of which is arranged an opening 4 for passage of an endless feeder 5, which conveys the fruit or vegetables from the hopper to an inclined feed-chute 6, located at the outer end of the chamber 3 and designed to conduct the fruit or vegetables by gravity to the slicer. (Not shown.)

The feeder 5 is properly inclined to conduct the fruit or vegetables—say apples—from the hopper 2 to the chute 6 and is composed of a link chain provided at intervals with cups 7, each of which is of a capacity to receive but one apple of a certain size at a time. Above the opening 4 the wall 3' is divided to form a slot 8, in which the upper portion of the inclined chain is received and moves.

Located at the top and bottom of the frame are transverse shafts 9 and 10, carrying sprocket-wheels 11 and 12, over which the chain runs. The upper shaft 9 is journaled in fixed bearings 9' and carries a crank-wheel 13, whereby the shaft may be operated by hand or power to drive the feeder. The lower shaft 10, however, is vertically slidable in slots 14 in the sides of the frame and is journaled in bearing-brackets 15, formed with slots 16 to receive bolts 17, securing them to the frame, said slots permitting of the adjusting of the shaft 10 toward and from the shaft 9 to maintain the chain taut, as hereinafter described. Upon the operation of the shaft 9 to the right the chain is driven, and its working stretch moves upwardly through the opening 4, hopper 2, and chamber 3, the cups taking up the apples from the hopper and conveying them to and depositing them upon the chute 6 in a manner that will be readily understood by reference to Fig. 3 of the drawings.

Connected to the frame 1 is a tube 18, which is located in alinement with the opening 4 and serves to guide the working stretch of the chain in its upward movement, thus preventing it from moving out of line, and consequently preventing any undue oscillation and tendency of the apples being shaken from the cups and dropping back into the hopper. Extending into the opening 4 from opposite sides thereof are valves 19 in the form of flexible flaps, which prevent the apples in the hopper from falling into and clogging said opening when the latter is unoccupied by a cup and are adapted to yield upwardly under the pressure of the cups and then drop back to close the opening. This action of the flaps also prevents the apples from crowding against the cup, making it impossible for more than one apple—namely, that seated in the cup—from being carried by the cup to the discharge-chute.

Mounted in bearings 20 on the frame is a rock-shaft 21, which is provided at one end with a crank-arm 22, attached by a connecting-rod 23 to a crank 24 upon one end of the shaft 10. Said rock-shaft is also provided with a second crank-arm 25, located intermediate of its length and connected to the lower end of a connecting-rod 26, which is attached at its upper end to the inner free end of a vibrating bar 27, pivoted at its outer end by a resilient strap 28 to the frame to vibrate vertically in a slot 29, formed in the hopper-bottom 2'. In the operation of the machine the rotation of the shaft 10 causes the bar 27 to be vibrated by the intermediate connections just described, and this action of the bar prevents the apples in the hopper 2 from wedging and packing and keeps them in a loosened state, so that they may be readily taken up by the cups 7.

Each cup 7 is approximately of U form and is provided around its edges with a groove or recess 30 to receive a cushioning-strip 31, secured thereto by thread-stitches or suitable fastening devices passing through openings 32, formed in the cup. This cushioning-strip, which may be composed of rubber, felt, yarn, or other like soft or yielding material, prevents injury to the apples by allowing them to seat without coming in contact with the relatively harder body of the cup, thus obviating all liability of the apples becoming bruised or cut while handled by the conveyer. As shown, the soft seat formed by the cushioning-strip is rounded to form a seating-surface devoid of angles. In some cases, however, I may round the edge of each cup to form a seat and dispense with the strips.

In operation the apples are placed within the hopper 2 and the conveyer set in operation to convey them one by one to the discharge-chute 6, by which they are conducted to the slicer. The conveyer is kept at the proper degree of tautness or tension by the adjustment of shaft 10 through the bearing-brackets 15.

The advantages resulting from my improved structure are that the apples are fed positively one by one to the slicer, so that choking of the latter cannot possibly occur; that bruising or cutting of the apples by the conveyer is effectually prevented; that the apples are kept in a constantly-loosened state in the hopper and cannot wedge or pack therein, and that as the working stretch of the conveyer is positively guided in a direct path all liability of jostling of the apples from the cups is entirely obviated. The machine when run by power requires no attendant other than a boy to feed the hopper at stated intervals, as it is positive and reliable in action and not liable to get out of order.

From the foregoing description, taken in connection with the accompanying drawings, it is thought that the construction, mode of operation, and advantages of my improved self-feeder for vegetable-slicers will be readily apparent without requiring a more extended explanation.

Various changes in the form, proportion, and the minor details of construction may be resorted to without departing from the principle or sacrificing any of the advantages of this invention.

Having thus described the invention, I claim—

1. In a self-feeder for slicing-machines, a hopper having an opening therein and a discharge-chute, a conveyer having its working stretch moving through said opening and through the hopper between said opening and the discharge-chute, and provided with cups, and means for positively guiding the said working stretch of the conveyer in its path of travel through the opening and to the discharge-chute, substantially as described.

2. In a self-feeder for slicing-machines, a hopper having an opening therein, a conveyer having its working stretch moving through said opening and provided with cups and opposing flexible flaps normally closing said opening, substantially as set forth.

3. In a self-feeder for slicing-machines, a hopper, a conveyer moving through the hopper, a vibrating agitator in the hopper, and means for simultaneously operating the conveyer and agitator, substantially as set forth.

4. In a self-feeder for slicing-machines, a hopper, a vibrating agitator therein, upper and lower shafts, a conveyer mounted on said shafts and moving through the hopper, a rock-shaft, and crank connections between the rock-shaft and agitator and said shaft and one of said conveyer-shafts, substantially as set forth.

5. In a self-feeder for slicing-machines, an endless conveyer provided with cups each having a continuous rounded edge, forming a non-bruising seat, substantially as set forth.

6. In a self-feeder for slicing-machines, a hopper having an opening therein, a conveyer having its working stretch moving through said opening and provided with cups, and a tube for positively guiding the working stretch of the chain, substantially as set forth.

7. In a self-feeder for slicing-machines, a frame or casing having a hopper and a discharge chute or passage, said hopper being provided with a bottom-opening, sprocket-wheels or pulleys arranged above and below said opening, an endless conveyer mounted on said wheels or pulleys and having its working stretch traveling through the hopper-opening and hopper and to said chute or passage, and means for guiding the working stretch of the chain to move in a direct line through the said hopper-opening and hopper, substantially as described.

In testimony whereof I have hereunto set my hand in presence of two subscribing witnesses.

SYLVESTER J. EVANS.

Witnesses:
HARRY F. WELTON,
CLARA V. POST.